US009940915B2

(12) United States Patent
Guo

(10) Patent No.: US 9,940,915 B2
(45) Date of Patent: Apr. 10, 2018

(54) EFFECT UNIT BASED ON DYNAMIC CIRCUIT MODELING METHOD THAT CAN CHANGE EFFECT WIRELESSLY

(71) Applicant: Runbo Guo, Changsha, Hunan (CN)

(72) Inventor: Runbo Guo, Hunan (CN)

( * ) Notice: Subject to any disclaimer, the term of this patent is extended or adjusted under 35 U.S.C. 154(b) by 0 days.

(21) Appl. No.: 15/451,701

(22) Filed: Mar. 7, 2017

(65) Prior Publication Data

US 2018/0061384 A1 Mar. 1, 2018

(30) Foreign Application Priority Data

Aug. 29, 2016 (CN) .......................... 2016 1 0738768

(51) Int. Cl.

*G01P 3/00* (2006.01)
*G10H 1/02* (2006.01)
*G10H 1/00* (2006.01)
*G10H 1/04* (2006.01)

(52) U.S. Cl.

CPC ......... *G10H 1/0083* (2013.01); *G10H 1/0008* (2013.01); *G10H 1/04* (2013.01); *G10H 2250/151* (2013.01)

(58) Field of Classification Search

CPC ....... H04N 21/42203; G10H 2210/281; G10H 2240/211; G10H 1/0091; G10H 1/125; G10H 2210/221; G10H 2210/235; G10H 2210/311; G10H 2250/151; H03G 5/025

See application file for complete search history.

(56) References Cited

U.S. PATENT DOCUMENTS

| | | | | |
|---|---|---|---|---|
| 7,030,311 B2 * | 4/2006 | Brinkman | G06Q 20/00 | 709/203 |
| 8,300,841 B2 * | 10/2012 | Lindahl | H04R 5/04 | 381/119 |
| 8,682,462 B2 * | 3/2014 | Leonard | H04R 3/04 | 700/94 |
| 2003/0094092 A1 * | 5/2003 | Brinkman | G06Q 20/00 | 84/609 |
| 2004/0016338 A1 * | 1/2004 | Dobies | G10H 1/0091 | 84/662 |
| 2007/0234880 A1 * | 10/2007 | Adams | G10H 1/0066 | 84/601 |
| 2009/0038468 A1 * | 2/2009 | Brennan | G09B 5/06 | 84/609 |
| 2009/0272251 A1 * | 11/2009 | Georges | G10H 1/00 | 84/609 |

(Continued)

*Primary Examiner* — Marlon Fletcher

(74) *Attorney, Agent, or Firm* — AKC PATENTS, LLC

(57) ABSTRACT

An effect unit based on dynamic circuit modeling method that can change effect wirelessly, comprises a sound effect algorithm database, a mobile APP client and a sound effect device. The mobile APP client checks updates of the sound effect algorithm database, downloads new sound effect algorithms to the local device and displays the same in the form of a list, and the sound effect algorithms are downloaded to the sound effect device in a wireless communication mode by opening the wireless communication function of the mobile APP client; analog signals sent by an electrophone are converted into digital signals by ADC, the digital signals are processed by a DSP sound effect algorithm in the sound effect device, then the digital signals are converted into analog signals by DAC, and the analog signals are output by sound effect output equipment.

2 Claims, 5 Drawing Sheets

(56) References Cited

U.S. PATENT DOCUMENTS

| | | | | |
|---|---|---|---|---|
| 2010/0175543 | A1* | 7/2010 | Robertson | G10H 3/186<br>84/735 |
| 2011/0219942 | A1* | 9/2011 | Robertson | G10H 3/186<br>84/735 |
| 2013/0215827 | A1* | 8/2013 | Nam | H04L 65/1059<br>370/328 |
| 2013/0327201 | A1* | 12/2013 | Urry | G10H 1/06<br>84/626 |
| 2015/0262566 | A1* | 9/2015 | Ceccolini | G10H 1/348<br>84/746 |
| 2015/0304772 | A1* | 10/2015 | Risberg | H04R 3/007<br>381/55 |
| 2016/0133245 | A1* | 5/2016 | An | G10K 15/08<br>381/63 |
| 2017/0024495 | A1* | 1/2017 | Wang | G01R 23/20 |

* cited by examiner

EFFECT UNIT BASED ON DYNAMIC CIRCUIT MODELING METHOD THAT CAN CHANGE EFFECT WIRELESSLY

CROSS REFERENCE TO RELATED CO-PENDING APPLICATIONS

This application claims the benefit of Chinese National patent application Serial No. 201610738768.8 filed Aug. 29, 2016 and entitled "An effect unit based on dynamic circuit modeling method that can change effect wirelessly", the contents of which are expressly incorporated herein by reference.

FIELD OF THE INVENTION

The present invention relates to a music sound effect device, and particularly relates to an effect unit based on dynamic circuit modeling method that can change effect wirelessly.

BACKGROUND OF THE INVENTION

Sound effect devices of electronic musical instruments can be divided into analog circuit sound effect devices and digital circuit sound effect devices according to the forms of internal circuits. The analog circuit sound effect devices only provide one kind of or limited kinds of sound effects and functions, and thus are limited to a certain degree of use. The digital circuit sound effect devices can be used for selecting sound effects and functions within a specified range.

Some classic sound effect devices have been upgraded by manufacturers or have been out of production, so the classic sound effects of different eras and different versions are difficult to reproduce. Generally, the sound effect types and functions of the digital circuit sound effect devices are fixed. More specifically, the software of the digital circuit sound effect devices is matched with hardware, and cannot be changed at any time or randomly. Accordingly, the sound effects and the functions realized by the sound effect devices in the traditional sense are fixed. For example, an overdrive simulating sound effect device can only realize the sound effect of overdrive, but cannot produce the sound effect of reverberation. Different sound effect devices are needed in every performance for different performance styles, performance settings, and different player preferences. In this case, players need to carry multiple sound effect devices, so it is very inconvenient.

SUMMARY OF THE INVENTION

The technical problem to be solved by the present invention is to overcome the defects of the prior art and provide an effect unit based on dynamic circuit modeling method that can change effect wirelessly. Verified algorithms can be stored and updated via a server, and a mobile APP client communicates with a database in the server via the Internet. The algorithms in the server are continuously increased, and an algorithm library in the sound effect device can be continuously extended for a user.

To solve the above mentioned technical problem, the present invention puts forward a technical solution that an effect unit based on dynamic circuit modeling method that can change effect wirelessly includes a sound effect algorithm database, a mobile APP client and a sound effect device; the mobile APP client checks updates of the sound effect algorithm database, downloads new sound effect algorithms to the local device and displays the same in the form of a list, and the sound effect algorithms are downloaded to the sound effect device in a wireless communication mode by opening the wireless communication function of the mobile APP client; analog signals sent by an electrophone are converted into digital signals by ADC (Analog to Digital Conversion), the digital signals are processed by a DSP (Digital Signal Processor) sound effect algorithm in the sound effect device, then the digital signals are converted into analog signals by DAC (Digital to Analog Conversion), and the analog signals are output by sound effect output equipment.

In the present invention, the sound effect simulation algorithms include distortion, overdrive, compression, delay, modulation, reverberation and amplifier simulation algorithms.

In the present invention, the sound effect algorithms include a linear processing algorithm and a nonlinear processing algorithm; a recursive training method is adopted in the linear algorithm to establish a model for supplementing a linear main body; a fuzzy intelligent learning method is adopted in the nonlinear algorithm to obtain an optimal solution, system parameters are learned recursively based on a fixed model, and parameters closest to the original model are finally obtained.

The present invention has the advantages that: 1) classic sound effect devices or sound effect devices not in production can be reproduced; 2) practical use of users is convenient, and multiple sound effect devices are not needed, so that the playing site is simple; 3) the cost for purchasing sound effect devices is reduced for users, so that they can obtain more sound effects at a lower cost; and 4) because the algorithms stored in the sound effect algorithm database are continuously increased, a user can switch the algorithms at any time via an APP to change the sound effect device into the one with different single sound effects or a combined sound effect, without separately purchasing one sound effect device for various sound effects.

If a nonlinear portion exists in traditional sound effect modeling, the transfer function of the nonlinear portion is fixed. An improvement is made to dynamic modeling of the present invention based on this.

1) Adding One or More Control Variables

Compared with the traditional static modeling technology, the nonlinear modeling portion of dynamic modeling considers variable parameter components in a circuit and other external factor changes for reference. The performance of the circuit in dynamic operation is simulated more truly. FIG. 1 shows a nonlinear transfer function of a nonlinear circuit in consideration of the change of an operational amplifier circuit.

2) Considering the Influence of Characteristics of Part of Electronic Components Themselves.

In traditional circuit modeling, all components including resistors, capacitors, inductors and the like are generally regarded as ideal electronic components. The dynamic modeling considers the influence of characteristics of some electronic components themselves, e.g., the capacitor should be analyzed and simulated as FIG. 2 in the circuit.

A real equivalent circuit of a capacitor is as shown in FIG. 2. Its practical impedance expression is $$Z \approx \left(R_S + \frac{1}{\omega^2 * C_P^2 * R_P}\right) + j\left(\omega L_S - \frac{1}{\omega * C_P}\right)$$

It can be seen from the expression that the practical impedance is related to the frequency and the Q value/D value. During high-frequency work, all capacitors show part of inductance characteristics. However, the capacitors show the resistance characteristic under various frequencies. Hence, multiple factors need to be comprehensively considered for modeling of only one capacitor, and other components in the circuit also need to be calculated according to their practical equivalent circuits likewise.

It can be seen that the needed calculation quantity is huge if a practical circuit, particularly a nonlinear circuit, is comprehensively simulated. An efficient performance simulation platform cannot be realized by simply connecting modules in series. Therefore, the following sound effect algorithm model method is implemented in the present invention.

Tone Algorithm Implementation Based on a Nonlinear Model.

A linear dominant model can well simulate non-synthetic tone, and synthetic tone is mostly based on a nonlinear model. The nonlinear model is obtained by hearing of a music algorithm engineer all the time. However, the nonlinear model is always relatively complex in practical structure, a complete and appropriate model cannot be established absolutely by experience, e.g., a sound head model and the like, and it is difficult for all products in the present market to match original models.

As shown in FIG. 3, a new fuzzy intelligent learning method is adopted in the present invention, the optimal solution of a system is obtained from the perspective of mathematics, and system parameters are learned recursively based on a fixed model, so that the final system model is closest to the original model. The present invention can restore much natural tone and pure classic effect tone via the intelligent fuzzy learning function.

Tone Algorithm Implementation Based on a Linear Dominant Model.

In order to better simulate real or classic tone, the present invention adopts a recursive training method, the linear main body is supplemented with the aid of the model, then a more exact model of the system is obtained, and the working efficiency of a product is furthest improved at the same time. The core architecture of the algorithm is as shown in FIG. 4, it can be seen from the figure that the nonlinear implementation key lies in the automatic learning process of parameters, and the algorithm is realized by model prediction and result comparison analysis.

BRIEF DESCRIPTION OF THE DRAWINGS

In order to illustrate the technical solution in the embodiments of the present invention more clearly, a simple introduction will be made below to the drawings required in the embodiments of the present invention. Apparently, the drawings described below are some embodiments of the present invention only, based on which other drawings could be obtained by those of ordinary skill in the art without any creative effort.

DETAILED DESCRIPTION OF THE INVENTION

In order to conveniently understand the present invention, a more comprehensive and detailed description will be made to the present invention in combination with a preferred embodiment, but the protection scope of the present invention is not limited to the specific embodiment below.

It should be specially noted that when one element is described as being "fixed, fixedly connected, connected or communicated to" the other element, it can be fixed, fixedly connected, connected or communicated to the other element directly or indirectly via other medium connector.

Unless otherwise defined, all technical terms used below have the same meanings as generally understood by those skilled in the art. The technical terms used in the present invention are merely used for describing the specific embodiment, rather than limiting the protection scope of the present invention.

Embodiment

Figure 1:
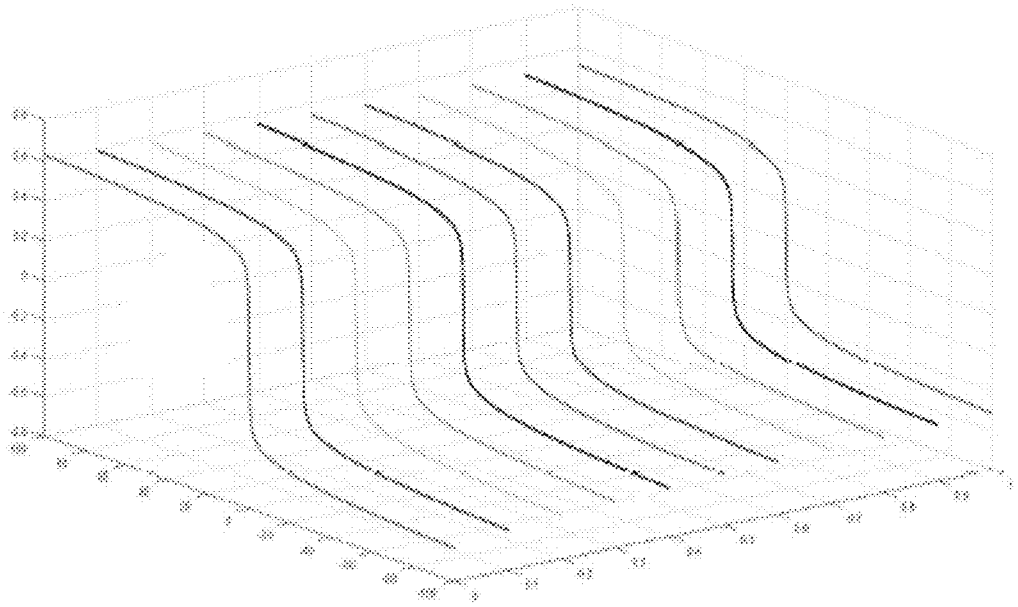
FIG. 1 shows a nonlinear transfer function when an operational amplifier circuit is changed in the present invention.
Figure 2:
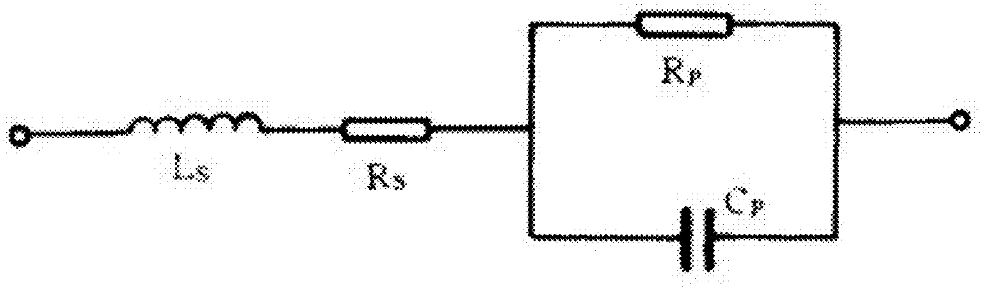
FIG. 2 is an equivalent circuit diagram of a capacitor in dynamic modeling.
Figure 3:
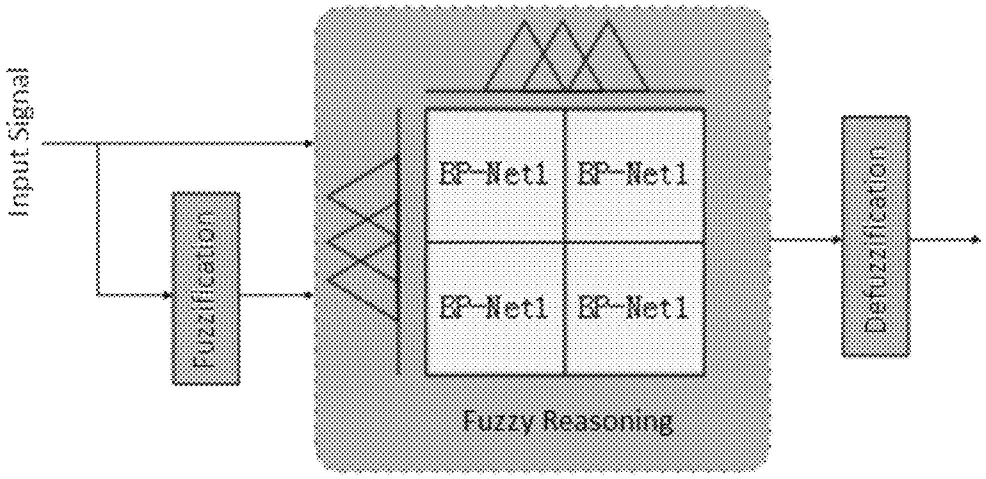
FIG. 3 shows a construction idea of a nonlinear dominant model.
Figure 4:
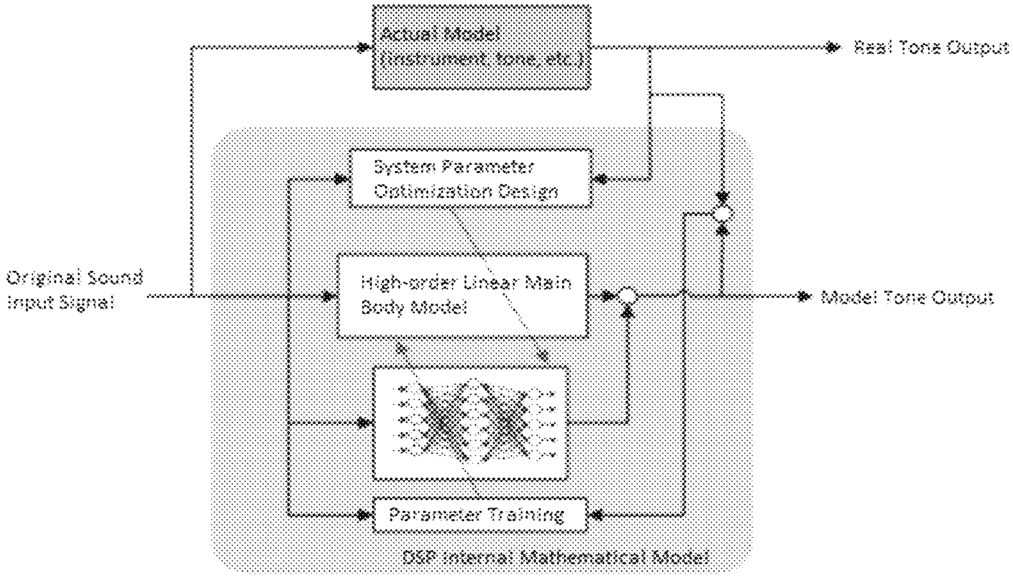
FIG. 4 shows a modeling principle of a linear dominant model.
Figure 5:
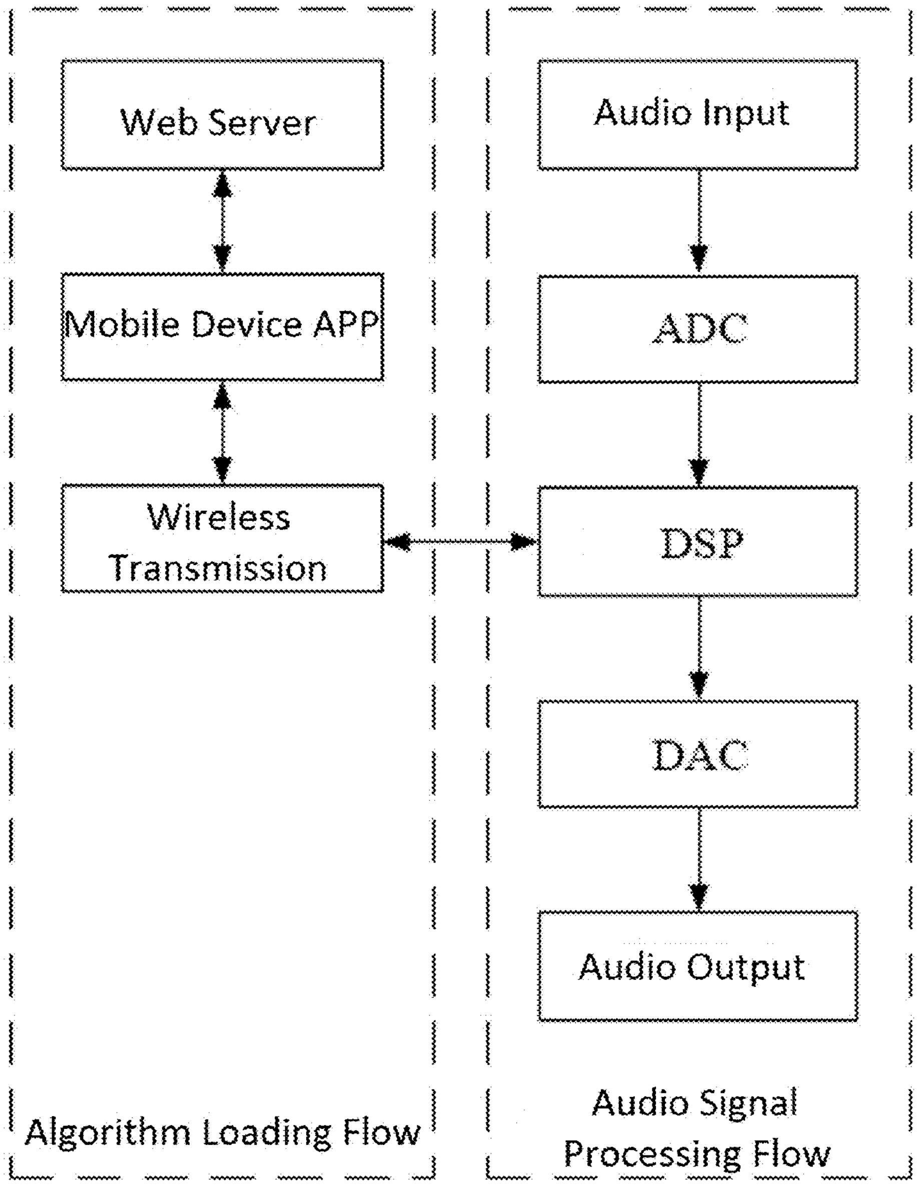
FIG. 5 is a block diagram of a principle structure of an effect unit based on dynamic circuit modeling method that can change effect wirelessly in the present invention.

FIG. 5 shows an effect unit based on dynamic circuit modeling method that can change effect wirelessly, including a sound effect algorithm database, a mobile APP client, a sound effect device, an electrophone and sound effect output equipment; the mobile APP client checks updates of the sound effect algorithm database, downloads new sound effect algorithms to the local and displays the same in the form of a list; the Bluetooth of the mobile APP client is opened and automatically paired with the sound effect device within an effective distance, and the sound effect algorithms are downloaded to the sound effect device in a wireless communication mode after successful pairing; analog signals sent by the electrophone are converted into digital signals by ADC, the digital signals are processed by a DSP sound effect algorithm in the sound effect device, then the digital signals are converted into analog signals by DAC, and the analog signals are output by the sound effect output equipment.

In this embodiment, the sound effect simulation algorithms include distortion, overdrive, compression, delay, modulation, reverberation and amplifier simulation algorithms. In this embodiment, the sound effect algorithms include a linear processing algorithm and a nonlinear processing algorithm; a recursive training method is adopted in the linear algorithm to establish a model for supplementing a linear main body; a fuzzy intelligent learning method is adopted in the nonlinear algorithm to obtain an optimal solution, system parameters are learned recursively based on a fixed model, and parameters closest to the original model are finally obtained.

This embodiment has the advantages that: 1) classical sound effect devices or sound effect devices not in production can be reproduced; 2) practical use of users is convenient, and multiple sound effect devices are not needed, so that the playing site is simple; 3) the cost for purchasing sound effect devices is reduced for users, so that they can obtain more sound effects at a lower cost; and 4) because the algorithms stored in the sound effect algorithm database are continuously increased, a user can switch the algorithms at any time via an APP to change the sound effect device into the one with different single sound effects or a combined sound effect, without separately purchasing one sound effect device for various sound effects.

Several embodiments of the present invention have been described. Nevertheless, it will be understood that various modifications may be made without departing from the spirit and scope of the invention. Accordingly, other embodiments are within the scope of the following claims.

What is claimed is:

1. An effect unit based on dynamic circuit modeling method that can change effect wirelessly, comprising:

a database comprising sound effect algorithms;

a mobile application (APP) client;

a sound effect device comprising a Digital Signal Processor (DSP);

wherein the mobile APP client checks updates of the sound effect algorithms in the database, downloads new sound effect algorithms to the sound effect device and displays the sound effect algorithms in the form of a list;

wherein the mobile APP client downloads the sound effect algorithms to the sound effect device in a wireless communication mode by opening a wireless communication function of the mobile APP client;

wherein analog signals sent by an electrophone are converted into digital signals by an Analog to Digital Converter (ADC), the digital signals are then processed by the Digital Signal Processor (DSP) with the sound effect algorithms in the sound effect device thereby generating processed digital signals, and then the processed digital signals are converted into processed analog signals by a Digital to Analog Converter (DAC), and the processed analog signals are output by sound effect output equipment; and wherein the sound effect algorithms comprise a linear processing algorithm and a nonlinear processing algorithm; wherein a recursive training method is adopted in the linear algorithm to establish a model for supplementing a linear main body; wherein a fuzzy intelligent learning method is adopted in the nonlinear algorithm to obtain an optimal solution, system parameters are learned recursively based on a fixed model, and parameters closest to the original model are finally obtained.

2. The effect unit based on dynamic circuit modeling method that can change effect wirelessly according to claim 1, wherein the sound effect algorithms further comprise distortion, overdrive, compression, delay, modulation, reverberation and amplifier simulation algorithms.

* * * * *